United States Patent
Iyer et al.

(10) Patent No.: US 10,628,286 B1
(45) Date of Patent: Apr. 21, 2020

(54) SYSTEMS AND METHODS FOR DYNAMICALLY IDENTIFYING PROGRAM CONTROL FLOW AND INSTRUMENTING SOURCE CODE

(71) Applicant: Denso International America, Inc., Southfield, MI (US)

(72) Inventors: Gopalakrishnan Iyer, Santa Clara, CA (US); Ameer Kashani, Southfield, MI (US)

(73) Assignee: Denso International America, Inc., Southfield, MI (US)

( * ) Notice: Subject to any disclaimer, the term of this patent is extended or adjusted under 35 U.S.C. 154(b) by 0 days.

(21) Appl. No.: 16/163,916

(22) Filed: Oct. 18, 2018

(51) Int. Cl.
    *G06F 11/36* (2006.01)
(52) U.S. Cl.
    CPC ...... *G06F 11/3628* (2013.01); *G06F 11/3612* (2013.01); *G06F 11/3636* (2013.01); *G06F 11/3664* (2013.01)
(58) Field of Classification Search
    None
    See application file for complete search history.

(56) References Cited

U.S. PATENT DOCUMENTS

| | | | |
|---|---|---|---|
| 6,487,713 B1 | 11/2002 | Cohen et al. | |
| 6,668,372 B1 | 12/2003 | Wu | |
| 7,917,863 B2 | 3/2011 | Chandhoke et al. | |
| 8,136,091 B2 | 3/2012 | Erlingsson et al. | |
| 8,239,824 B2 | 8/2012 | Cifra et al. | |
| 8,302,072 B2 | 10/2012 | Chandhoke et al. | |
| 8,645,923 B1 | 2/2014 | Satish et al. | |
| 8,826,255 B1 | 9/2014 | Avadhanula et al. | |
| 8,875,109 B2 | 10/2014 | Murthy | |
| 9,141,350 B2 | 9/2015 | Stravers et al. | |
| 9,189,375 B1 | 11/2015 | Bastien et al. | |
| 2002/0052856 A1 | 5/2002 | Satoh | |
| 2003/0182414 A1 | 9/2003 | O'Neill | |
| 2004/0230890 A1 | 11/2004 | Fukuda et al. | |

(Continued)

FOREIGN PATENT DOCUMENTS

WO 2009156198 12/2009

OTHER PUBLICATIONS

Zhejun et al., "A static technique for detecting input validation vulnerabilities in Android apps", Science China Information Sciences, Science China Press, Heidelberg, vol. 60, No. 5, Sep. 12, 2016, pp. 1-16.

*Primary Examiner* — Daxin Wu
(74) *Attorney, Agent, or Firm* — Christopher G. Darrow; Darrow Mustafa PC

(57) ABSTRACT

System, methods, and other embodiments described herein relate to improving the functioning of a program. In one embodiment, a method includes, in response to detecting a code segment being added to source code of the program, identifying control flow characteristics of the source code including the code segment. The method includes updating a control flow graph of the source code according to the control flow characteristics. The control flow graph represents execution paths through the program that are comprised of nodes representing blocks of the source code and directed edges between the nodes representing transitions between the blocks. The method includes providing the control flow graph to improve functioning of the program by facilitating adjustments in the source code.

20 Claims, 8 Drawing Sheets

(56) References Cited

U.S. PATENT DOCUMENTS

| | | | |
|---|---|---|---|
| 2004/0255277 A1 | 12/2004 | Berg et al. | |
| 2005/0015752 A1 | 1/2005 | Alpern et al. | |
| 2005/0060696 A1* | 3/2005 | Bicsak | G06F 8/433 717/156 |
| 2005/0229154 A1 | 10/2005 | Hiew et al. | |
| 2006/0021054 A1 | 1/2006 | Costa et al. | |
| 2006/0161978 A1 | 7/2006 | Abadi et al. | |
| 2006/0174077 A1 | 8/2006 | Abadi et al. | |
| 2007/0240138 A1 | 10/2007 | Chess et al. | |
| 2008/0184016 A1 | 7/2008 | Erlingsson et al. | |
| 2009/0044171 A1 | 2/2009 | Avadhanula | |
| 2009/0249289 A1 | 10/2009 | Akritidis et al. | |
| 2009/0249308 A1* | 10/2009 | Li | G06F 11/3676 717/132 |
| 2009/0282393 A1 | 11/2009 | Costa et al. | |
| 2010/0023731 A1 | 1/2010 | Ito | |
| 2010/0192026 A1 | 7/2010 | Abadi et al. | |
| 2010/0306736 A1 | 12/2010 | Bordelon et al. | |
| 2011/0230978 A1 | 9/2011 | Jie et al. | |
| 2011/0231936 A1 | 9/2011 | Williams et al. | |
| 2012/0011493 A1 | 1/2012 | Singh et al. | |
| 2012/0110557 A1 | 5/2012 | Singh et al. | |
| 2012/0144376 A1 | 6/2012 | Eijndhoven et al. | |
| 2012/0324454 A1 | 12/2012 | Gounares et al. | |
| 2013/0055208 A1 | 2/2013 | Murthy | |
| 2013/0055209 A1* | 2/2013 | Murthy | G06F 8/315 717/126 |
| 2013/0055221 A1 | 2/2013 | Murthy et al. | |
| 2013/0116986 A1 | 5/2013 | Zhang et al. | |
| 2013/0283245 A1 | 10/2013 | Black et al. | |
| 2014/0298300 A1 | 10/2014 | Rhee et al. | |
| 2014/0380283 A1 | 12/2014 | Hu et al. | |
| 2015/0007146 A1* | 1/2015 | Li | G06F 11/3684 717/130 |
| 2015/0356294 A1 | 12/2015 | Tan et al. | |
| 2016/0179850 A1 | 6/2016 | Martin et al. | |
| 2016/0188440 A1* | 6/2016 | Bates | G06F 11/3624 717/129 |
| 2016/0210216 A1* | 7/2016 | Monahan | G06F 11/3604 |
| 2016/0274998 A1* | 9/2016 | Coyle | G06F 11/3664 |
| 2016/0300060 A1* | 10/2016 | Pike | G06F 11/3604 |
| 2017/0090926 A1 | 3/2017 | Spear et al. | |
| 2017/0109144 A1* | 4/2017 | Spoon | G06F 11/3604 |
| 2017/0116418 A1 | 4/2017 | Shanmugavelayutham et al. | |
| 2017/0124322 A1 | 5/2017 | Guilley et al. | |
| 2017/0212829 A1* | 7/2017 | Bales | G06F 11/3664 |
| 2017/0286104 A1 | 10/2017 | Abadi et al. | |

* cited by examiner

```
Source Code 200

...
Printf(char *var){
While (var[i] != 'x\00'):
Putc(var[i]; i++;
}
...

#include <stdio.h>
Int main()[
Printf("Hello");
return 0;
]
```

FIG. 2

SYSTEMS AND METHODS FOR DYNAMICALLY IDENTIFYING PROGRAM CONTROL FLOW AND INSTRUMENTING SOURCE CODE

TECHNICAL FIELD

The subject matter described herein relates in general to systems and methods for dynamically updating a control flow graph for a program, and, in particular, to dynamically providing the control flow graph to improve generating the program through identification of vulnerabilities and automatic instrumentation of functions.

BACKGROUND

Developing software programs can be a complex task. In particular, ensuring that a program conforms to desired standards in relation to, for example, formatting, security, performance, and so on can be a significant difficulty especially when a program is relatively robust and/or complex. That is, as the program becomes longer and includes more complex programmatic/data structures, identifying vulnerable aspects of the program (e.g., functions) and how the functions interact with other parts of the program increases in difficulty. In general, developers may reference control flow graphs in attempts to optimize a program and/or to better understand relationships between different functions/segments within the program. However, existing approaches to generating control flow graphs function after the program is complete and the existing approaches also produce large complex graphs that can be impractical for a developer to interpret. Accordingly, the present approaches do not provide the control flow graph in a timely manner nor interpretable so as to be useful when originally generating the program.

Similarly, adding instrumentation into the source code of the program can further complicate development. Instrumentation, in the context of computer programs, generally refers to additional code segment(s) that are included within a program to provide additional functionality. The additional functionality can relate to additional functional hooks, ensuring security, providing for traceability, enforcing control flow, and so on. However, the instrumentation is at times not accurately coded or may be unintentionally left out considering the many varied segments of instrumentation that are generally to be included within the program and subsequently verified. Consequently, functionality of the program that the instrumentation controls such as the program flow may not function appropriately leading to further difficulties such as security holes resulting from vulnerable functions.

SUMMARY

In one embodiment, example systems and methods associated with improving the functioning of a program are disclosed. As previously noted, current approaches to generating control flow graphs are generally inadequate because the approaches generate the graphs after the fact and also because the graphs can be complex and thus difficult to interpret. As a result, the usefulness of the control flow graphs to developers is limited when developing the program. Moreover, the process of manually instrumenting the program adds complexity to developing the program that can result in potentially under-instrumented source code or instrumented code that does not achieve the desired functionality.

Therefore, in one embodiment, a control flow system that generates control flow graphs of a program in real-time is disclosed. Moreover, the control flow system, in one embodiment, uses the control flow graph to provide additional functionality such as automatically instrumenting source code of the program to ensure proper execution of the program. For example, in one approach, the disclosed control flow system monitors an integrated development environment for code segments as the code segments are added to the source code that will subsequently be compiled into the program. The control flow system identifies control flow characteristics of the code segments in response to detecting the addition of the segments.

In general, the characteristics include, for example, aspects that influence intra-procedural or inter-procedural control flow of the program such as function calls, return addresses, and so on. With knowledge of the control flow characteristics, the system can dynamically generate/update sections of a control flow graph. For example, as additional code segments are integrated into the source code, the control flow system generates nodes, directed edges, and other aspects of the control flow graph that relate to the newly integrated code segments. In one aspect, the control flow system dynamically updates the control flow graph in real-time such that as the source code is being modified (e.g., added to, amended, etc.), the system is also adding new segments into the control flow graph and/or modifying existing segments.

Therefore, the control flow system, in one embodiment, uses the control flow graph to generate a visual representation. That is, the system, in one approach, electronically displays the visual representation of the control flow graph within the integrated development environment as a manner of informing a developer about the control flow characteristics of the program while the program is being developed. Thus, providing the control flow graph in real-time facilitates ensuring the appropriate programmatic structure of the program in relation to control flow and also further aspects. In this way, the control flow system improves the functionality and development of the program through better awareness of the control flow.

Of course, while a visual representation of the control flow graph is discussed, the control flow system can also provide the control flow graph to further modules/systems to facilitate additional functionality. For example, in one embodiment, the control flow system uses the control flow graph as a mechanism to automatically instrument the source code. The control flow system identifies control flow characteristics within the graph that, for example, should include instrumentation to facilitate securing the program flow. As such, the system integrates the instrumentation in real-time so that the instrumentation is automatically included along with particular aspects of the source code and also so that a developer can validate the instrumentation on-the-fly while developing the program and without needing to remember to include the instrumentation separately. In this way, the control flow system improves the security, secure development and ultimate functioning of the program through better ensuring proper control flow during software runtime.

In one embodiment, a control flow system for improving the functioning of a program is disclosed. The control flow system includes one or more processors and a memory that is communicably coupled to the one or more processors. The memory stores an analysis module including instructions that when executed by the one or more processors cause the one or more processors to in response to detecting a code segment being added to source code of the program, identify control flow characteristics of the source code including the code segment. The memory stores a graph module including instructions that when executed by the one or more processors cause the one or more processors to update a control flow graph of the source code according to the control flow characteristics. The control flow graph represents execution paths through the program that are comprised of nodes representing blocks of the source code and directed edges between the nodes representing transitions between the blocks. The graph module further includes instructions to provide the control flow graph to improve functioning of the program by facilitating adjustments in the source code.

In one embodiment, a non-transitory computer-readable medium is disclosed. The computer-readable medium stores instructions that when executed by one or more processors cause the one or more processors to perform the disclosed functions. The instructions include instructions to in response to detecting a code segment being added to source code of the program, identify control flow characteristics of the source code including the code segment. The instructions include instructions to update a control flow graph of the source code according to the control flow characteristics. The control flow graph represents execution paths through the program that are comprised of nodes representing blocks of the source code and directed edges between the nodes representing transitions between the blocks. The instructions include instructions to provide the control flow graph to improve functioning of the program by facilitating adjustments in the source code.

In one embodiment, a method of improving the functioning of a program is disclosed. The method includes, in response to detecting a code segment being added to source code of the program, identifying control flow characteristics of the source code including the code segment. The method includes updating a control flow graph of the source code according to the control flow characteristics. The control flow graph represents execution paths through the program that are comprised of nodes representing blocks of the source code and directed edges between the nodes representing transitions between the blocks. The method includes providing the control flow graph to improve functioning of the program by facilitating adjustments in the source code.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 2 illustrates one example of source code of a program.

DETAILED DESCRIPTION

Figure 1:
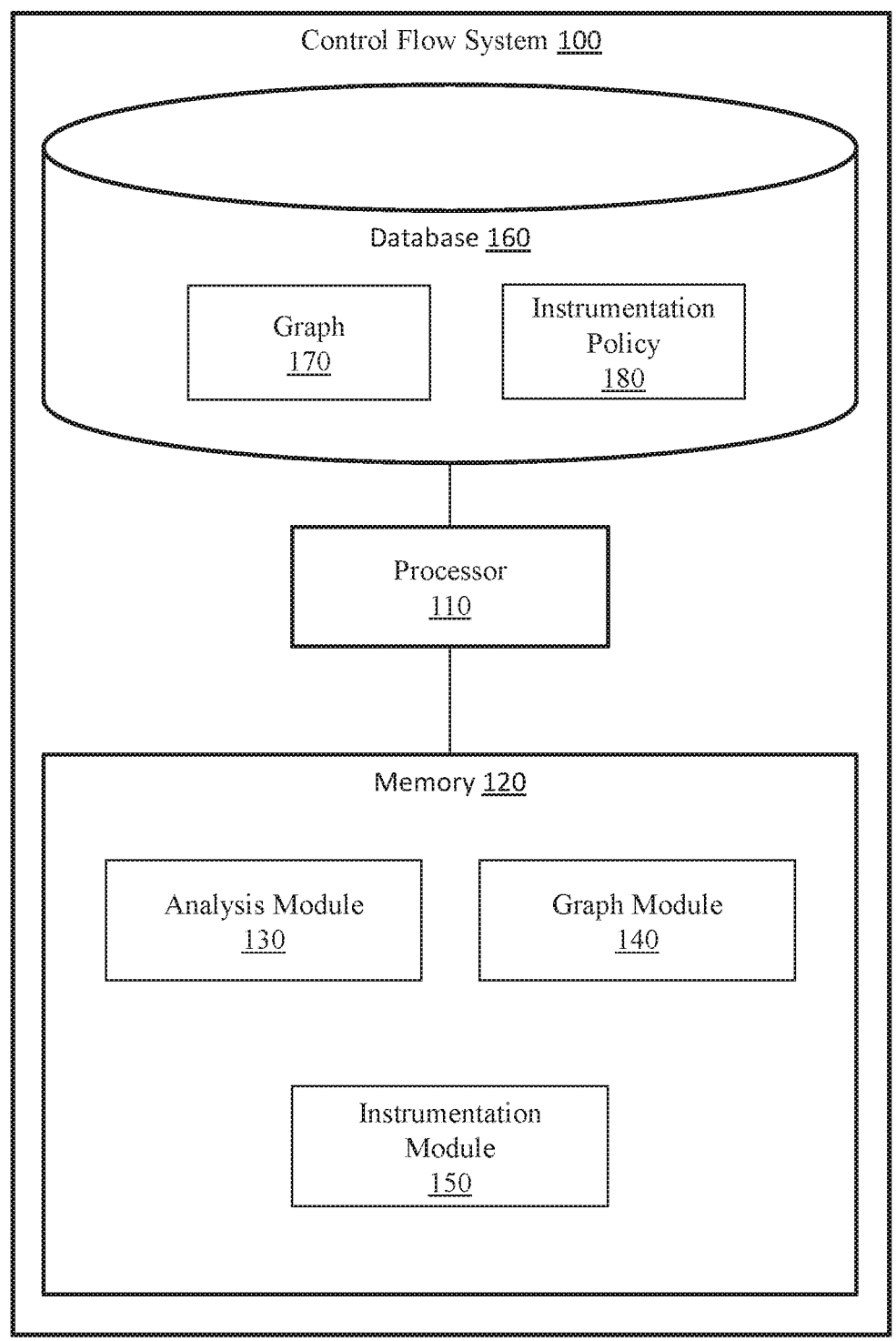
FIG. 1 illustrates one embodiment of a control flow system that is associated with generating control flow graphs and performing other functions in relation to source code of a program.

Systems, methods and other embodiments associated with improving the functioning of a program through the dynamic generation of control flow graphs and auto-inclusion of instrumentation are disclosed. As previously noted, current approaches to generating control flow graphs encounter difficulties related to the timeliness of when the graphs are available and to the interpretability of the graphs associated with the complexity of the graph's form. As a result, the control flow graph can have limited applicability during development because of the noted issues.

Moreover, because the control flow graph is generally unavailable when developing the program, additional functionality that may be facilitated by the control flow graph is also delayed or completely unavailable. For example, the process of instrumenting the program when done manually adds complexity to developing the program that can result in potentially under-instrumented source code or instrumented code that does not achieve the desired functionality.

Therefore, in one embodiment, a control flow system that generates control flow graphs of a program in real-time is disclosed. Moreover, the control flow system, in one embodiment, uses the control flow graph to provide additional functionality such as instrumenting source code automatically through policies defined in relation to the control flow graph. Accordingly, providing for the automatic instrumentation of the program can facilitate ensuring proper execution (e.g., program flow) of the program.

In one approach, the disclosed control flow system monitors an electronic data stream within, for example, an integrated development environment for code segments. As the control flow system detects the code segments or modifications to existing code segments, the control flow system, for example, analyzes the code segments and how the code segments are integrated with existing source code, if any, to identify control flow characteristics of the code segments (i.e., how the code segments influence program flow).

In general, the characteristics include, for example, aspects that influence intra-procedural and/or inter-procedural control flow of the program such as function calls, return addresses, and so on. With knowledge of the control flow characteristics, the system can dynamically generate/update sections of a control flow graph. For example, as additional code segments are integrated into the source code, the control flow system generates/modifies nodes, directed edges, and other aspects of the control flow graph that relate to the newly integrated code segments. In one aspect, the control flow system dynamically updates the control flow graph in real-time such that as the source code is being modified (e.g., added to, amended, etc.), the system is also adding new segments into the control flow graph and/or modifying existing segments.

Therefore, the control flow system, in one embodiment, uses the control flow graph to generate a visual representation of the execution flow of the program. That is, the control flow system, in one approach, electronically displays the visual representation of the control flow graph within the integrated development environment with real-time updates as a manner of informing a developer about the control flow characteristics of the program while the program is being developed. Thus, providing the control flow graph in real-time facilitates ensuring the appropriate programmatic structure of the program in relation to control flow and also further aspects. In this way, the control flow system improves the functionality of the program by facilitating the development of the program through better awareness of the program flow.

Of course, while a visual representation of the control flow graph is discussed, the control flow system can also provide the control flow graph to further modules/systems to facilitate additional functionality. For example, in one embodiment, the control flow system uses the control flow graph as a mechanism to automatically instrument the source code. The control flow system identifies control flow characteristics within the graph that, for example, should include instrumentation to monitor, secure or otherwise ensure the program flow. As such, the system integrates the instrumentation in real-time so that the instrumentation is automatically included along with particular aspects of the source code and also so that a developer can validate the instrumentation on-the-fly while developing the program and without explicitly remembering to include the instrumentation. In this way, the control flow system improves the development and ultimate functioning of the program through better ensuring proper program flow.

Referring to FIG. 1, one embodiment of a control flow system 100 is illustrated. While arrangements will be described herein with respect to the control flow system 100, it will be understood that embodiments are not limited to a unitary system as illustrated. In some implementations, the control flow system 100 may be embodied as a cloud-computing system, a cluster-computing system, a distributed computing system, a software-as-a-service (SaaS) system, and so on. Accordingly, the control flow system 100 is illustrated and discussed as a single device for purposes of discussion but should not be interpreted as limiting the overall possible configurations in which the disclosed components may be configured. For example, the separate modules, memories, databases, and so on may be distributed among various computing systems in varying combinations.

The control flow system 100 also includes various elements. It will be understood that in various embodiments it may not be necessary for the control flow system 100 to have all of the elements shown in FIG. 1. The control flow system 100 can have any combination of the various elements shown in FIG. 1. Further, the control flow system 100 can have additional elements to those shown in FIG. 1. In some arrangements, the control flow system 100 may be implemented without one or more of the elements shown in FIG. 1. Further, while the various elements are shown as being located within the control flow system 100 in FIG. 1, it will be understood that one or more of these elements can be located external to the control flow system 100. Further, the elements shown may be physically separated by large distances.

Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the control flow system 100 is implemented to perform methods and other functions as disclosed herein relating to improving execution/program flow of a program. The noted functions and methods will become more apparent with a further discussion of the figures. Furthermore, the control flow system 100 is shown as including a processor 110. Thus, in various implementations, the processor 110 may be a part of the control flow system 100, the control flow system 100 may access the processor 110 through a data bus or another communication pathway, the processor 110 may be a remote computing resource accessible by the control flow system 100, and so on. In either case, the processor 110 is an electronic device such as a microprocessor, an ASIC, a Graphics Processing Unit (GPU), or another computing component that is capable of executing machine-readable instructions to produce various electronic outputs therefrom that may be used to control or cause the control of other electronic devices.

In one embodiment, the control flow system 100 includes a memory 120 that stores an analysis module 130, a graph module 140, and an instrumentation module 150. The memory 120 is a random-access memory (RAM), read-only memory (ROM), a hard-disk drive, a flash memory, or other suitable memory for storing the modules 130, 140, and 150. The modules 130, 140, and 150 are, for example, computer-readable instructions that when executed by the processor 110 cause the processor 110 to perform the various functions disclosed herein. In various embodiments, the modules 130, and 140 can be implemented in different forms that can include but are not limited to hardware logic, an ASIC, a Graphics Processing Unit (GPU), components of the processor 110, instructions embedded within an electronic memory, and so on.

With continued reference to the control flow system 100, in one embodiment, the system 100 includes a database 160. The database 160 is, in one embodiment, an electronic data structure stored in the memory 120, a distributed memory, a cloud-based memory, or another data store and that is configured with routines that can be executed by the processor 110 for analyzing stored data, providing stored data, organizing stored data, and so on. Thus, in one embodiment, the database 160 stores data used by the modules 130, 140, and 150 in executing various determinations. In one embodiment, the database 160 stores the graph 170. In further embodiments, the control flow system 100 stores the graph 170 in the memory 120, a specialized data structure, a cache memory of the processor 110, or another suitable data storage component.

As used herein, the program refers to compiled machine code that is derived from source code. Thus, the program is, in one embodiment, a compiled program or portion thereof that is machine code. The phrase "machine code" as used herein generally refers to a program that is represented in machine language instructions that can be, for example, executed by a microprocessor such as the processor 110. Moreover, the machine code is generally understood to be a primitive or hardware-dependent language that is comprised of opcodes defined by an instruction set implemented by associated hardware. Furthermore, the machine code itself is further comprised of data values, register addresses, memory addresses, and so on. Of course, while the program is discussed as being machine code, in further embodiments, the program is assembly code or another intermediate representation of the source code.

The source code from which the program is compiled is comprised of, for example, functions, data structures, objects, statements, and so on. Instrumentation that is included as part of the source code is further comprised of the same elements (e.g., objects, statements, etc.). In general, the program is organized as a set of functions. In various renditions, the functions may be nested within one another as sub-functions. Moreover, the functions are generally comprised of a set of statements (e.g., loops, I/O statements, etc.) and are typically focused on a particular functionality. That is, each separate function is generally implemented to perform a particular task. Thus, sub-functions may implement sub-routines in support of a broader functionality of a parent function. In either case, the functions include source code that defines the statements that form the function itself and provide for implementing the functionality associated with the function.

Furthermore, as discussed herein, the noted modules 130, 140, and 150 may function as plugins into an integrated development environment. The integrated development environment (IDE) is a program or collection of programs that provide facilities for the development of software. For example, an IDE can include a source code editor, build tools, debuggers, compilers, interpreters, a graphical user interface (GUI), and so on. In general, IDEs are a mechanism for improving the efficiency of developers (i.e., programmers) through providing an overall environment with tools and other aspects that facilitate the creation of programs. Thus, as noted, in one or more arrangements, the modules 130, 140, and 150 are plugins that integrate with the IDE to provide additional functionality. Accordingly, in one approach, the modules 130, 140, and 150 access electronic data of the IDE including electronic input and output streams including, for example, code segments provided electronically into the IDE. The modules 130, 140, and 150 may leverage an application program interface (API) of the IDE to facilitate the access. Moreover, such access may be provided in the form of application hooks that automate (e.g., provide direct integral access) the integration of the modules 130, 140, and 150. In either case, the system 100 and the modules 130, 140, and 150 generally function cooperatively with the IDE. Thus, the IDE in execution generally manages the source code from which the program is compiled and may also provide for actually compiling the source code into the program.

Continuing with elements of the database 160, the graph 170 is a control flow graph that represents execution paths through the program. In one embodiment, as will be discussed in greater detail subsequently, the analysis module 130 and the graph module 140 function together to derive the graph 170 from source code as the source code is dynamically provided into the IDE. The graph module 140 forms the graph using, in one approach, nodes, and directed edges between the nodes. The nodes represent blocks/segments of the source code while the directed edges between the nodes represent transitions between the blocks. The blocks are atomic segments of code (e.g., uninterrupted) or at least integrally related segments of the source code. The directed edges, in one embodiment, indicate intra-procedural and/or inter-procedural control flow transfers between the blocks/segments. That is, the edges represent handovers, function calls, concrete and/or symbolic function arguments, and so on. In general, the directed edges illustrate transfers in the execution of the program between the separate blocks. It should be appreciated that in separate embodiments the nodes and directed edges may be defined differently than set forth herein. For example, in one approach, the segments/blocks that comprise the nodes and conditions that define the directed edges are specified according to a graph policy. The graph policy defines templates, example segments/conditions, and/or metrics for identifying the blocks/segments and transitions that form the nodes and edges, respectively. In general, the graph module 140 utilizes the graph policy to provide the most suitable elements to form the graph 170. Thus, the system 100 can be implemented to flexibly define aspects of the graph 170 according to separate implementations.

Figure 3:
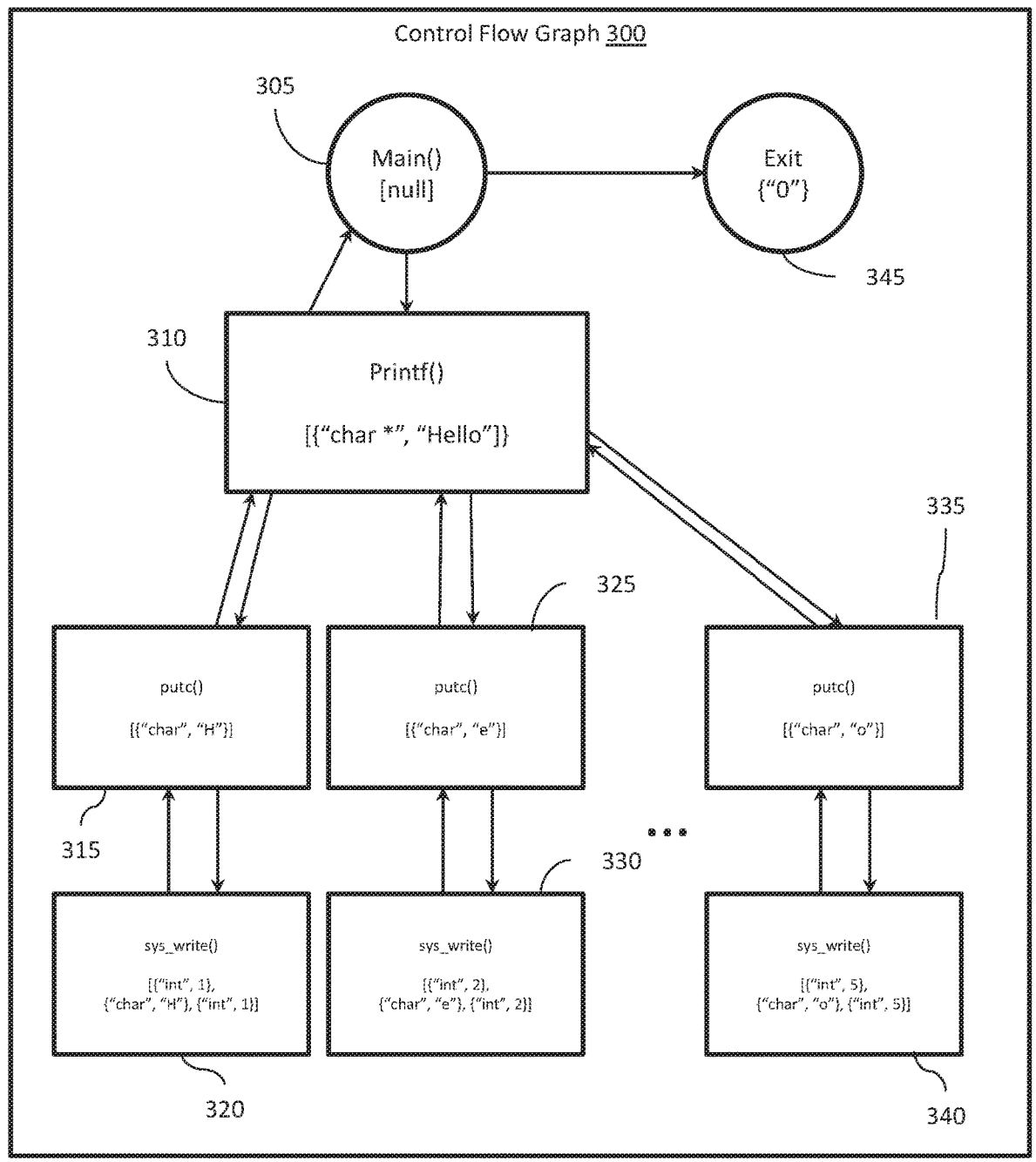
FIG. 3 illustrates one example of a control flow graph that the system of FIG. 1 derives from the source code of FIG. 2.

By way of example, FIG. 2 illustrates a sample segment of the source code of a program. Additionally, FIG. 3 illustrates an example control flow graph 300. The control flow graph 300 is an illustrative example of a graph as may be generated by the graph module 140 from inputs provided via the analysis module 130. Accordingly, the graph 300 includes nodes 305, 310, 315, 320, 325, 330, 335, 340, and 345 that correspond with segments/blocks of code from the source code 200. The graph 300 further illustrates directed edges between the nodes that correspond with relationships between the segments of the source code 200. Moreover, the separate nodes and directed edges are, for example, defined according to control flow characteristics of the source code. That is, the ways in which the blocks/segments of the source code inter-relate and delineations between the blocks/segments themselves are defined according to control flow characteristics of the source code. As will be discussed further subsequently, the graph module 140 generally identifies the control flow characteristics from the source code of the program and may do so according to a graph policy defined within the system 100.

Figure 4:
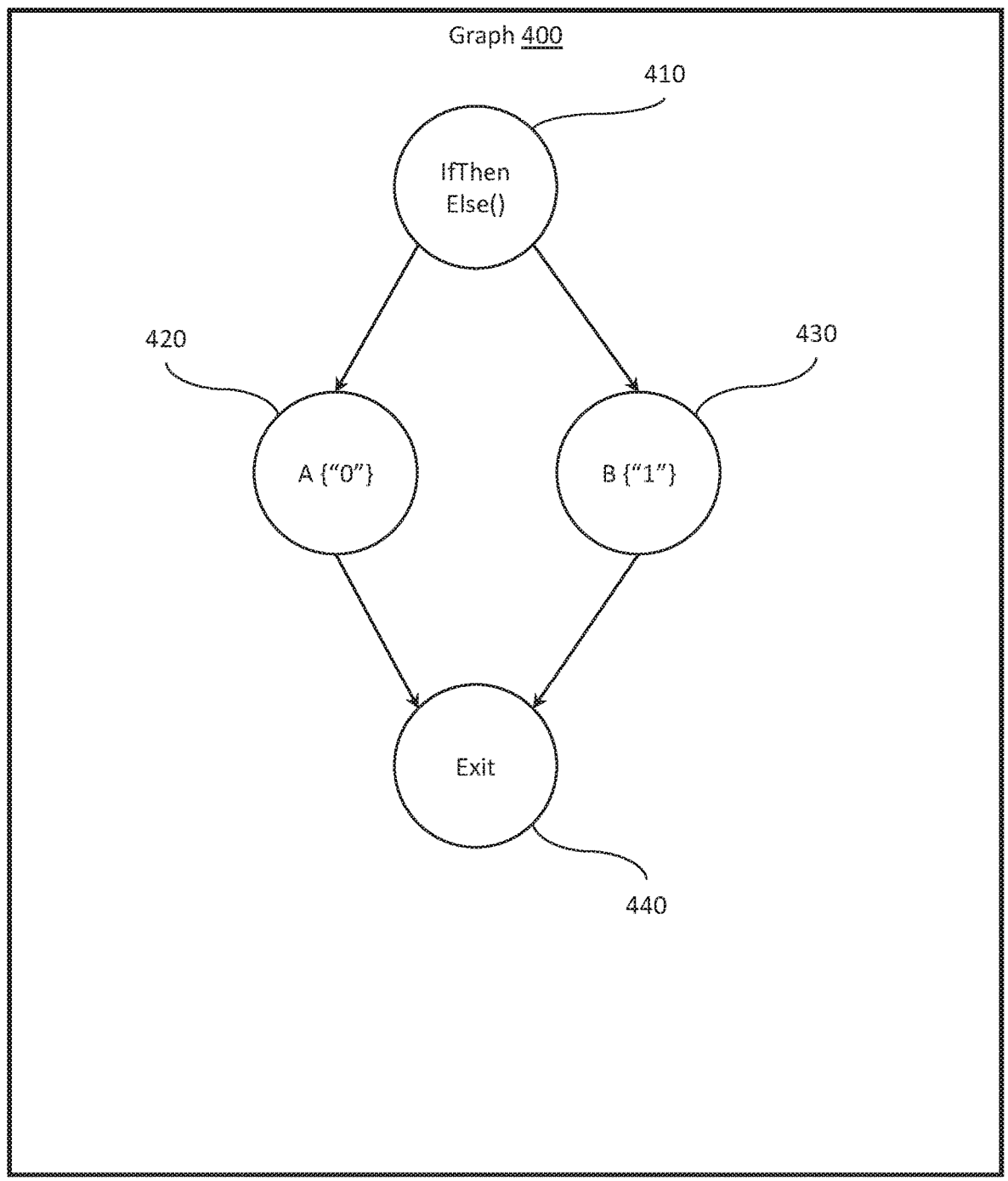
FIG. 4 illustrates a further example of a control flow graph.
Figure 5:
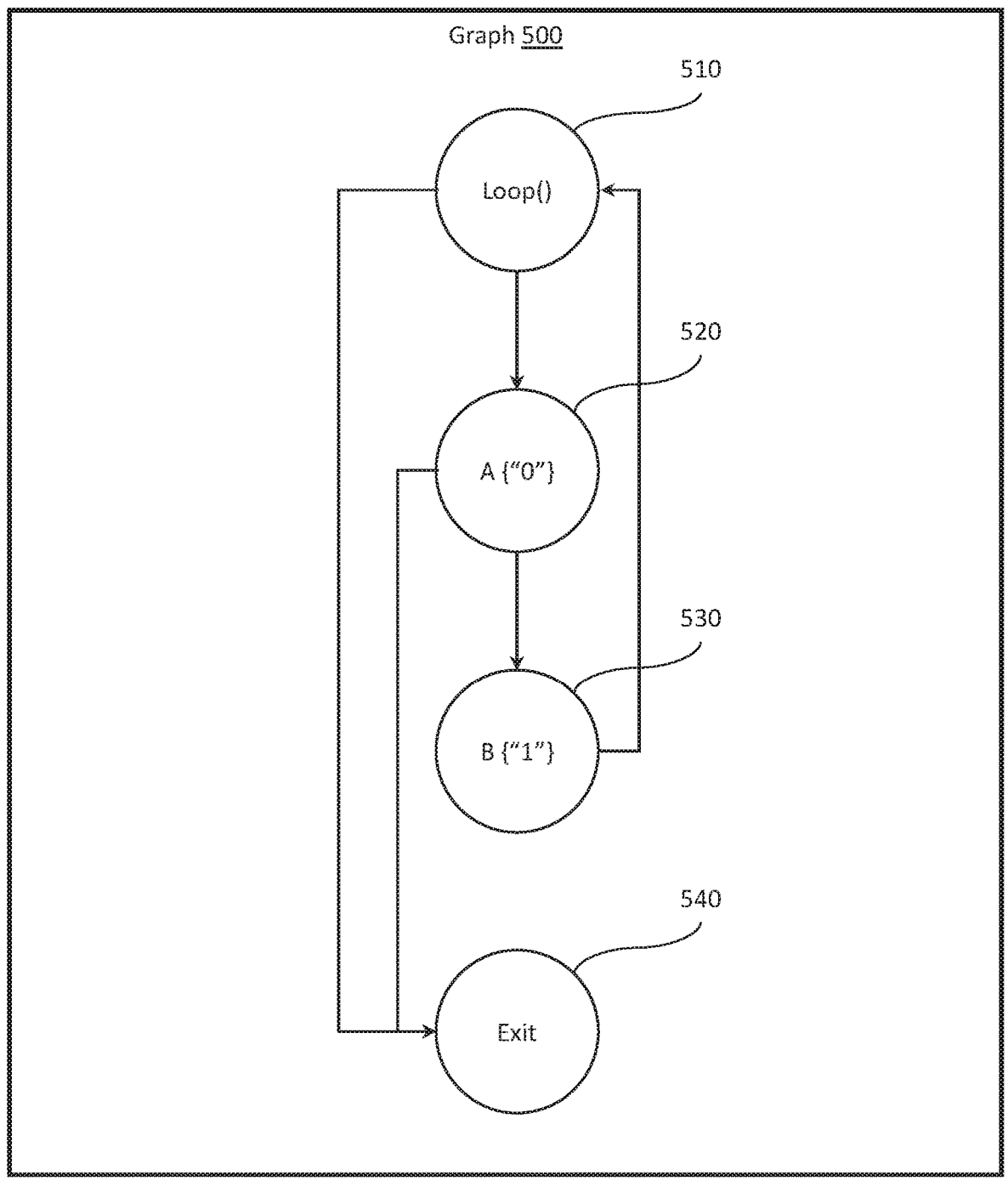
FIG. 5 illustrates an additional example of a control flow graph.

In either case, FIGS. 4 and 5 illustrate further examples of control flow graphs 400 and 500 that correspond with different segments of source code. For example, as illustrated in FIG. 4, the graph 400 includes four separate nodes 410, 420, 430, and 440 that correspond with separate segments of source code correlating with separate paths through an if-then-else statement as indicated by the corresponding directed edges. Moreover, FIG. 5 illustrates the graph 500 including nodes 510. 520, 530, and 540 that represent segments of code within an associated block/function. As illustrated, the graph 500 represents a loop that includes two separate exit conditions as illustrated by the separate directed edges leading to the exit node 540. Thus, the graph 170 can depict many different configurations of source code in order to represent an execution flow of a program. Moreover, it should be appreciated that the provided examples relate to relatively short code segments, and, as a general tendency, the graph 170 includes a plurality of nodes and directed edges therebetween. As one example, the "exit" nodes as illustrated in the example graphs 400 and 500, in various implementations, generally indicate transitions to separate code segments instead of actual program exits. As such, the graph 170 facilitates better understanding by developers when rendered in a visual format and also provides for facilitating further automated functions through providing an understanding of the program flow to various modules.

Continuing with the database 160 of FIG. 1, the instrumentation policy 180 defines various conditions and/or segments of source code for which the instrumentation module 150 includes instrumentation within the source code as will be discussed in greater detail subsequently. In general, the instrumentation can serve different purposes depending on a particular implementation. For example, the instrumentation can be integrated within a function to provide for controlling program flow (e.g., ensuring the program isn't misdirected), for debugging, for verifying data arguments, for verifying I/O, and so on. For example, in an instance where the program controls an advanced driving assistance system (ADAS) to automatically adjust how a vehicle is controlled on the road, the instrumentation may include security instrumentation to prevent malicious manipulation of the program flow that could result in an accident and injury to passengers if the program is misdirected through a malicious attack.

In further aspects, the instrumentation policy 180 also defines instrumentation thresholds or at least metrics for generating the instrumentation thresholds. In one approach, the instrumentation policy 180 defines instrumentation thresholds for different classes of functions. For example, the instrumentation policy 180, in one embodiment, defines classes for functions according to a security level as may be tagged by a developer or derived according to defined metrics associated with code segments. Thus, the instrumentation policy 180 can indicate a first threshold for a first class, a second threshold for a second class, a third threshold for a third class and so on. In general, the separate classes and associated thresholds for security levels may relate to a vulnerability of a particular function (e.g., exposure to manipulation) or to other aspects. Thus, the instrumentation policy 180 may indicate different thresholds at which segments are to be instrumented in order to optimize inclusion of the instrumentation. Thus, in practice, the instrumentation module 150, for example, assesses the code segments and automatically includes the instrumentation according to the assessment.

Moreover, the actual instrumentation itself that is included within the code segments is defined, in one embodiment, as templates within the aforementioned graph policy. For example, the templates define a set of standardized instrumentation that performs various functions in relation to controlling program flow, verifying I/O, providing additional functional hooks, and so on. Moreover, the templates, in one approach, further indicate variables that are, for example, customized by the instrumentation module 150 according to a particular code segment with which the instrumentation is included. That is, the instrumentation module 150, in one example, may include instrumentation to verify a return address of a function. Thus, the instrumentation module 150 modifies variables of an associated instrumentation statement from the template to correspond with the associated source code and provide security or other functionality for the associated source code segment by using the template as a base. Further aspects of the instrumentation policy 180 and the instrumentation module 150 will be discussed subsequently.

Continuing with FIG. 1, the analysis module 130, in one embodiment, includes computer-readable instructions that when executed by the processor 110, cause the processor to detect a code segment as the code segment is being added to the source code. In one approach, the analysis module 130 accesses the IDE internally to through an application program interface (API) or other program hook to access an electronic input stream within the IDE. The electronic input stream generally includes any electronic inputs provided into the IDE through other system components of an associated computing device. For example, the analysis module 130 monitors electronic inputs from other processes executing on the processor 110, electronic communications received via a network communication interface, intra-process (i.e., within the IDE) communications, I/O inputs from machine interface devices connected with the computing device (e.g., keyboard), file system resources, and so on.

Accordingly, the analysis module 130, in one approach, monitors the noted electronic inputs for additions, and/or modifications to the source code of the program. That is, the analysis module 130 monitors a stream of inputs into the IDE for new code segments, inputs modifying existing code segments, and so on.

Moreover, the analysis module 130, in one embodiment, also includes instructions to analyze the source code to identify control flow characteristics of the source code. That is, as changes are made within the source code, the analysis module 130 actively detects the changes in real-time as the changes are occurring, and analyzes the changes in relation to the source code overall to identify control flow characteristics associated therewith. In one embodiment, the control flow characteristics include intra-procedural and/or inter-procedural control flow transfers of the program such as function calls, and return address along with symbolic names, function arguments and return values, along with a calling convention, and so on. More generally, the control flow characteristics relate to any aspects that influence a form and/or content of the graph 170. Thus, the analysis module 130 undertakes the noted monitoring and analysis in real-time in order to identify the control flow characteristics so that the graph module 140 can maintain the graph 170 in an updated form.

Accordingly, the graph module 140 includes, in one embodiment, computer-readable instructions that when executed by the processor 110, cause the processor 110 to update the control flow graph 170 according to the control flow characteristics. It should be noted that the graph module 140, in general, generates the graph 170 as an electronic data structure that includes programmatic elements for representing the nodes and directed edges. Initially, the graph module 140 generates the graph 170 including null values or just an entry node from which the graph module 140 builds through the noted updates as the source code is developed.

Thus, the graph module 140 updates the graph 170 in real-time as adjustments/modifications are made to the graph 170. Accordingly, the graph module 140, in one embodiment, actively uses the control flow characteristics as the analysis modules 130 determines the characteristics from the incoming I/O that includes new code segments, modified code segments, instructions to modify aspects of the source code, and so on. Accordingly, the graph module 140 develops the graph 170 in a piecewise manner as the modifications/additions occur in order to provide a real-time assessment of the program defined by the source code.

Moreover, the graph module 140, in one embodiment, further includes instructions to provide the control flow graph 170 to improve the functioning of the program by facilitating adjustments in the source code. That is, for example, the graph module 140 develops the graph 170 through the inclusion of changes/additions in real-time as the changes/additions occur. The graph 170 represents possible execution paths and associated conditions through the program as the program is executed. Accordingly, the graph 170 provides insights into potential errors within the source code (e.g., infinite loops, exposed functions, etc.) that can be leveraged by various modules and systems to improve the source code in order to avoid difficulties (e.g., security holes, program faults, etc.) in the program once compiled.

As such, the graph module 140, in one embodiment, provides the graph 170 by generating a visual representation of the control flow graph 170 and dynamically displaying the visual representation within the integrated development environment (IDE). Accordingly, as the code segment is generated and provided into the IDE, the analysis module 130 identifies and analyzes the code segment along with impacts on the overall source code to provide the control flow characteristics. From the control flow characteristics, the graph module 140 generates the graph 170 and the visual representation as a real-time representation of the program such that effects of the modifications are visually depicted in real-time to a developer. In one or more embodiments, the visual representation is electronically displayed in a window within the IDE and including identifiers that indicate the modifications/updates to the graph 170.

Thus, by way of example, and with reference to FIGS. 2, 3 and 4, consider that the code 200 is modified to include an if-then-else statement. Accordingly, the analysis module 130 detects the modification to the source code and analyzes the modified code to generate the control flow characteristics. The graph module 140 then generates the nodes and directed edges for the newly added statement according to the control flow characteristics and modifies the graph 300 to include the graph 400 at, for example, node 325. Thus, graph module 140 can further render this adjustment within the visual representation to graphically illustrate the change while adjusting the original graph to accommodate the newly added segment.

Additionally, in alternative embodiments, the graph module 140 also provides the graph to further modules/components within the system 100 or otherwise. For example, in one embodiment, the control flow system 100 includes an instrumentation module 150. The instrumentation module 150 includes instructions that when executed by a processor cause the processor (e.g., processor 110) to integrate instrumentation within the source code according to the control flow graph 170. For example, in one approach, the instrumentation module 150 adds instrumentation into the source code in real-time and responsive to modifications in the source code as reflected by the graph 170. Accordingly, the instrumentation module 150 can monitor for particular conditions such as changes in the graph 170, inclusion of new code segments in the source code, modifications to existing code segments, and so on which act as electronic requests into the instrumentation module 150 through, for example, an API of the IDE or another suitable mechanism. The electronic requests induce the instrumentation module 150, in one embodiment, to include instrumentation where program flow is to be ensured and/or where the instrumentation is to provide separate functionality in relation to particular code segments of the source code.

As previously noted, the instrumentation policy 180 indicates various mechanisms for identifying which aspects of the source code (e.g., via metrics or other conditions for identifying locations and types of instrumentation) are to be instrumented. In various aspects, the instrumentation included by the instrumentation module 150 is to enforce runtime checks within the program by ensuring execution of the program follows the control flow graph 170. Thus, the instrumentation module 150 generally uses the knowledge of the program flow conveyed via the graph 170 in order to know how to include instrumentation for enforcing the program flow. Moreover, the instrumentation module 150, in further aspects, also references to the graph 170 to understand data flows, and other aspects that are instrumented within the program. In this way, the instrumentation module 150 improves the security of the program by automatically instrumenting runtime checks. Furthermore, the instrumentation module 150, in one embodiment, includes instrumentation to perform address checks (e.g., memory addresses for data and program flow), variable/function return type checks, data-bound checks, opcode checks, match call-return pairs (non-single class), and so on.

Of course, while the instrumentation module 150 is discussed as dynamically including the instrumentation within source code in real-time, as the developer provides new code segments and adjusts existing code segments, the instrumentation module 150, in an alternative arrangement, executes over a completed or initial version of the source code to include the instrumentation. In one approach, the instrumentation module 150 automatically adds the instrumentation when initiated in parallel with a request to compile the program.

In either arrangement, the instrumentation module 150 analyzes the source code and the control flow graph 170 to integrate instrumentation within the source code. In particular, the instrumentation module 150 identifies segments of the source code that are to be instrumented according to correlations between the control flow graph 170 and the source code such as procedural transitions (e.g., jumps, calls, returns, etc.) within the source code as identified by directed edges in the graph 170. Moreover, the instrumentation module 150 automatically adds the instrumentation according to the identified segments by modifying templates of defined instrumentation to customize the defined instrumentation of the templates according to the source code. In this way, defined sets of instrumentation can be, for example, pre-tested and certified in order to ensure the added instrumentation performs as desired.

In still further aspects, the instrumentation module 150 includes the instrumentation according to tagged/labeled sections of the source code. That is, for example, in one embodiment, the instrumentation module 150 monitors for an electronic input within the IDE, and, in particular, within a particular statement, function or other segment of the source code that identifies the particular statement, function or segment as a portion of the source code that is to be instrumented. In various approaches, the electronic input tags the portion of the source code to indicate the basic need for instrumentation while, in further aspects, the input specifies the particular instrumentation that is to be included or at least characteristics of the instrumentation. For example, the provided label may indicate a sensitive/high-value function that is to be instrumented with control flow instrumentation, whereas in further aspects the provided label/tag may not specify characteristics of the instrumentation but simply indicates that the portion of the code should be analyzed by the instrumentation module 150 to be automatically instrumented.

In either case, the instrumentation module 150 can label/tag the portions of the source code according to the electronic inputs to further inform the subsequent generation of the instrumentation. The originating form of the electronic input can vary according to implementation but generally includes selection of elements in the GUI of the IDE that specify characteristics of a subsequent input as providing the tag to the portion of the source code. For example, one or more attribute selections may be activated within the GUI after which a portion of the source code that is selected is tagged with the attributes automatically by the module 150.

Figure 6:
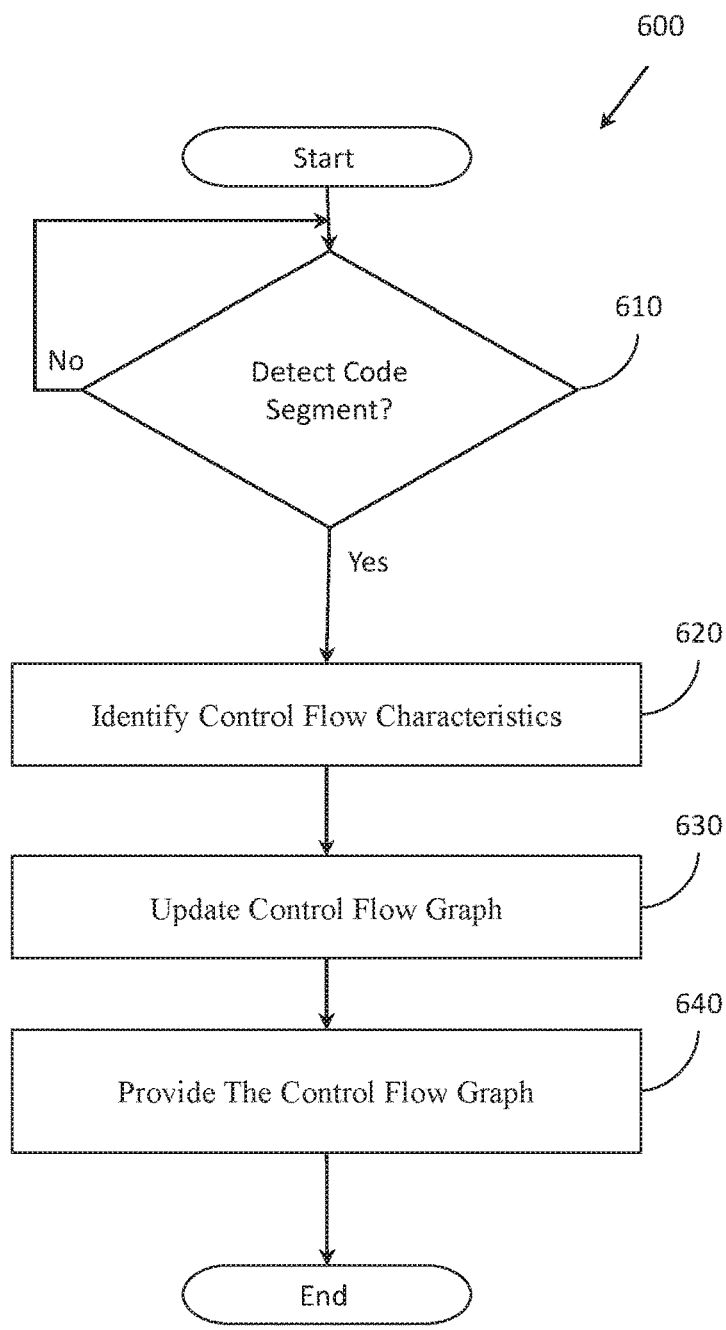
FIG. 6 illustrates one embodiment of a method associated with generating a control flow graph in real-time.

Additional aspects of generating control flow graphs and providing further functionality therefrom will be discussed in relation to FIG. 6. FIG. 6 illustrates a method 600 associated with generating control flow graphs in real-time. Method 600 will be discussed from the perspective of the control flow system 100 of FIG. 1. While method 600 is discussed in combination with the control flow system 100, it should be appreciated that the method 600 is not limited to being implemented within the control flow system 100 but is instead one example of a system that may implement the method 600.

At 610, the analysis module 130 monitors for and periodically detects a code segment being added to the source code of the program. It should be noted, that as used herein, adding a code segment at 610 generally refers to adding new code segments, and also modifying existing code segments within the source code of the program. More generally, the analysis module 130 monitors an electronic input stream into an integrated development environment (IDE) within a computing device for inputs (e.g., code, commands, etc.) that involve changes to the source code. Accordingly, the analysis module 130, in one embodiment, continuously monitors the input stream into the IDE through, for example, an API to identify when the source code is being modified (i.e., added to or changed). Consequently, upon detecting the noted modification, the analysis module 130 proceeds to identify control flow characteristics at block 620.

At 620, the analysis module 130 identifies the control flow characteristics of the graph 170. In one embodiment, the analysis module 130 analyzes the source code using a depth-first search to traverse statements within the source code. In further aspects, the analysis module 130 implements other suitable approaches to traversing the source code and identifying the characteristics as may be appreciated. When the analysis module 130 is traversing the source code, the module 130 is parsing statements within the source code to identify at least function calls, function return addresses, function arguments, function return values, and relationships between the statements as the control flow characteristics.

In various implementations, the analysis module 130 analyzes effected portions of the source code associated with the detected code segment/changes from 610, while in further aspects, the analysis module 130 re-analyzes the source code overall to identify the control flow characteristics in response to a change. In general, the approach that is undertaken is related to an overall size of the source code, a size of the modification, and available resources for performing the analysis. Thus, in one embodiment, the analysis module 130 selectively undertakes a partial or full review to determine the control flow characteristics according to an indicated preference. Whichever approach is performed by the analysis module 130, the control flow characteristics provide information about intra-procedural and/or inter-procedural control flow transfers of the program that are to be represented in the graph 170.

Additionally, the analysis module 130, in one embodiment, further identifies which statements of the source code include vulnerabilities by comparing the control flow characteristics with a graph policy. In one embodiment, the graph policy defines conditions indicative of security vulnerabilities and performance bottlenecks. Accordingly, the additional information about vulnerabilities and bottlenecks can also be included within the control flow characteristics such that the information is subsequently integrated with the graph 170 to provide further indications about characteristics of different portions of the source code. Moreover, in various approaches, the analysis module 130 uses further information specified by the graph policy to identify the vulnerabilities and bottlenecks. Thus, the graph policy may further specify conditions in the program associated with data flow, data arguments, data exposure, and program flow that correlate with the vulnerabilities. In either case, the analysis module 130 can include aspects that are both directly and indirectly related to the program flow within the control flow characteristics for inclusion in the graph 170.

At 630, the graph module 140 updates the control flow graph 170. In one embodiment, the graph module 140 uses the control flow characteristics identified at 620 in order to form nodes and directed edges of the graph 170. Consider that the control flow graph generally represents execution paths through the program, and thus the graph module 140 uses the control flow characteristics to identify the paths (e.g., directed edges) between different code segments (e.g., nodes) from which the graph 170 is formed. Thus, the graph module 140 updates the control flow graph 170 by adding the control flow characteristics corresponding to the detected code segment while modifying existing nodes and edges of the control flow graph to accommodate the code segment. That is, for example, existing directed edges may be re-routed while additional nodes are added, existing nodes may be modified, indicated conditions can be modified or new conditions added, and so on.

Additionally, as previously noted, the graph module 140 functions in real-time as the code segment is being added to the source code to update the graph 170. As such, the graph module 140 maintains the graph 170 in an updated form so that reference may be made directly to the graph 170 in order to facilitate the development of the program.

Moreover, the graph module 140 also updates the graph 170 with the additional characteristics as previously described. That is, the graph module 140 tags or otherwise provides annotations in the graph 170 about vulnerabilities of code segments associated with nodes, bottlenecks associated with various nodes, and other notable characteristics. Accordingly, not only does the graph module 140 actively develop the graph 170 as the source code is being written but the graph module 140 also provides additional information about the code segments within a data structure of the corresponding nodes in order to facilitate mitigation of the vulnerabilities and bottlenecks by, for example, highlighting the particular characteristics.

At 640, the graph module 140 provides the control flow graph 170 to improve the functioning of the program by facilitating adjustments in the source code. As previously explained, the control flow graph 170 provides a representation of how execution of the program will progress and thus provides insights about the source code that are generally otherwise not identifiable. As such, various systems can leverage the graph 170 to manipulate the source code and/or provide further functionality to developers.

As one aspect of providing the control flow graph 170 at 640, the graph module 140 generates a visual representation of the control flow graph and dynamically displays the visual representation within an integrated development environment (IDE) as the code segment is generated to provide a real-time representation of the program. The visual representation is provided as a graphic that includes the nodes, directed edges, and other symbolic representations of the source code in a fashion that is similar to, for example, the graphs of FIGS. 3-5. Additionally, the graph 170 can also be visually represented to display in various colors that can highlight different attributes of the graph 170 and underlying source code such as the noted vulnerabilities and performance bottlenecks. In this way, the system 100 improves ultimate program functionality by ensuring the program avoids performance bottlenecks and security vulnerabilities through better informing the development of the source code. As previously described, the graph 170 can also be leveraged by further systems/modules to provide additional functionality as will now be discussed in relation to FIG. 7.

Figure 7:
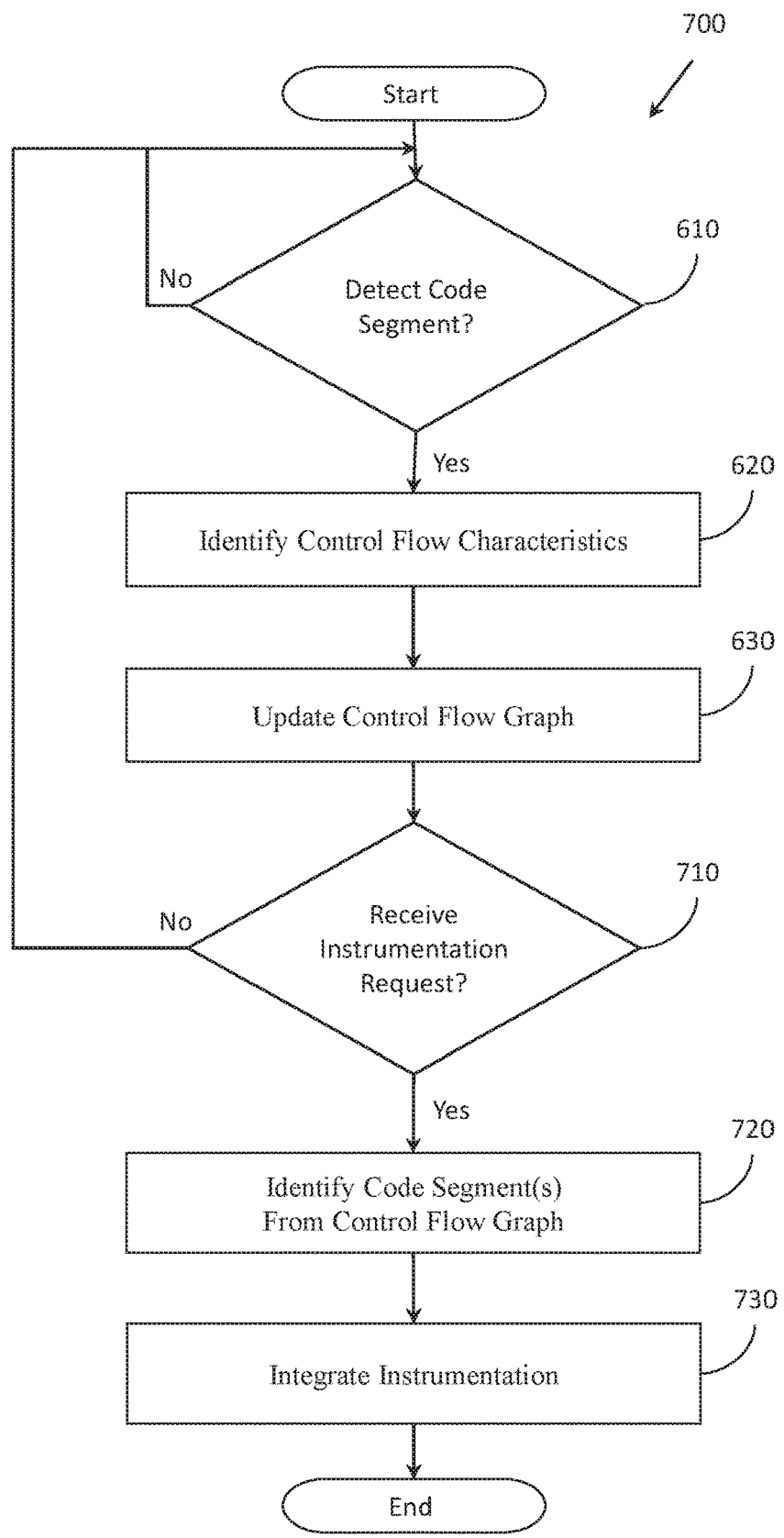
FIG. 7 illustrates one embodiment of a method associated with automatically instrumenting source code.

FIG. 7 illustrates a method 700 associated with automatically instrumenting source code of a program. In a similar fashion as discussed in relation to FIG. 6, method 700 will be discussed from the perspective of the control flow system 100 of FIG. 1. While method 700 is discussed in combination with the control flow system 100, it should be appreciated that the method 700 is not limited to being implemented within the control flow system 100 but is instead one example of a system that may implement the method 700.

As an initial note, method 700 is illustrated as including blocks 610, 620, and 630 from method 600 of FIG. 6. As such, the discussion of the noted blocks will not be reiterated. Additionally, it should be appreciated that the graph 170 is generally provided into the method 700 at block 710 as an electronic output of the block 630.

At 710, the instrumentation module 150 monitors for and detects a request to instrument the source code. In various embodiments, the request may take different forms. For example, in one approach, the request is coincident with any modifications to the source code for which the graph 170 is modified. That is, when the graph 170 is updated according to modifications to the source code, the instrumentation module 150 also functions to instrument the source code in real-time for the modifications if instrumentation is to be included for added code segments or changes to the existing code segments.

Alternatively, the instrumentation request is generated by the system 100 once the source code is completed or, in a further aspect, when the source code is to be compiled into the program. Accordingly, the request to instrument the source code is, in one embodiment, generated by the system 100 in response to a request to compile the source code generated within the IDE, and is acted upon prior to the compiling. Thus, the instrumentation module 150 functions in real-time to instrument the source code as the source code is modified or once the source code is ready to be compiled.

At 720, the instrumentation module 150 identifies code segments of the source code that are to be instrumented. In one embodiment, the instrumentation module 150 identifies the code segments according to existing tags placed on the segments in the source code, according to labeled characteristics in the graph 170 associated with the code segments, according to identified control flows represented in the graph 170, and/or according to further metrics/characteristics as defined by the instrumentation policy 180. In general, the instrumentation module 150 is instrumenting the source code to ensure the flow of the program during execution, and to, for example, prevent malicious redirection. Thus, the instrumentation module 150 identifies code segments that are involved in directly or indirectly transferring control between functions, adjusting program flow addresses, and other such code segments. In general, the noted code segments are associated with the directed edges within the graph 170 or conditions associated with transfers embodied by the directed edges.

Accordingly, in further aspects, the instrumentation module 150 analyzes the source code according to the control flow graph 170. The instrumentation module 150 also, in one or more embodiments, may analyze the individual code segments in order to determine whether the code segments satisfy the instrumentation policy 180 as implemented for including instrumentation. That is, various conditions such as thresholds according to importance level, security level, etc. can be identified for determining when to include instrumentation within a function. In this way, the instrumentation can be included in an intelligent manner so as to consider the performance and security of the program and to avoid unnecessarily including instrumentation when possibly not needed.

In either case, because not all code segments/functions within the source code are to be instrumented, the check at 720 may include assessing whether the code segment is to be instrumented. That is, for example, the instrumentation module 150 assesses the characteristics of the newly added/adjusted code segment to determine whether the code segment is to include instrumentation. If the instrumentation module 150 determines the code segment is to be instrumented, then the instrumentation module 150 continues to integrate the instrumentation as discussed at block 730. Otherwise, the instrumentation module 150 may exit if only a modified segment is being considered or no other segments overall are being considered.

At 730, the instrumentation module 150 integrates instrumentation within the source code. As previously noted, in one embodiment, the instrumentation module 150 includes the instrumentation according to the control flow graph 170 to enforce runtime checks within the program that improve the security of the program by ensuring execution of the program follows the control flow graph 170. That is, the instrumentation that is added to the source code ensures the program cannot be directed outside of the paths represented by the graph 170.

Moreover, the process of integrating the instrumentation includes, in one embodiment, the instrumentation module 150 automatically adding the instrumentation according to the identified segments by modifying templates of defined instrumentation according to the source code. As previously explained, the instrumentation module 150 adjusts variable aspects of the templates to conform to a code segment with which the instrumentation is being integrated. Accordingly, the instrumentation module 150 customizes the included instrumentation to achieve the particular functionality while also using instrumentation that is, for example, pre-approved and generally known to function correctly. In this way, the instrumentation module 150 uses the graph 170 to provide additional functionality that ultimately improves the resulting program by ensuring secured program flow.

Figure 8:
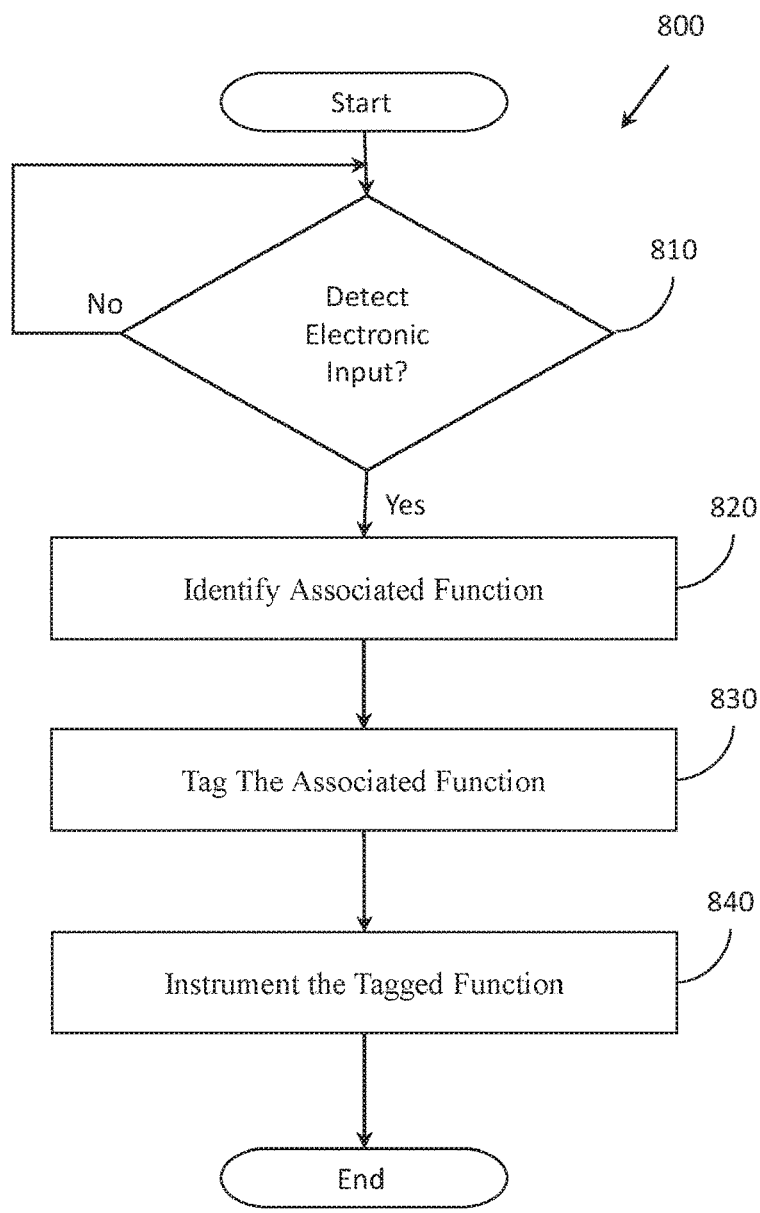
FIG. 8 illustrates one embodiment of a method associated with tagging portions of source code within which to include instrumentation.

FIG. 8 illustrates a method 800 associated with automatically identifying code segments that are to include instrumentation. In a similar fashion as discussed in relation to FIGS. 6 and 7, method 800 will be discussed from the perspective of the control flow system 100 of FIG. 1. While method 800 is discussed in combination with the control flow system 100, it should be appreciated that the method 800 is not limited to being implemented within the control flow system 100 but is instead one example of a system that may implement the method 800.

At 810, the instrumentation module 150 determines whether an electronic input is present for tagging a code segment. In one embodiment, the instrumentation module monitors electronic requests generated by a GUI of the IDE to identify when, for example, a tagging action has been initiated. The tagging action may include initially selecting a control function within the IDE via a first electronic input followed by a second electronic input that indicates a function/code segment that is to be tagged. Thus, the first electronic input, in one embodiment, activates functionality within the IDE associated with the tagging while the second electronic input identifies, for example, which segment/function is to be tagged.

In one approach, the combination of electronic inputs within the IDE, which may be from an automated source (e.g., a script executing within the IDE) or according to electronic inputs received via an I/O interface (e.g., HMI inputs), form an electronic request. Thus, the instrumentation module 150, in one embodiment, monitors for the electronic request that is generated by the IDE. The electronic request can indicate various aspects such as which function/code segment that is to be instrumented, characteristics of the instrumentation (e.g., control flow, data verification, etc.), and so on.

At 820, in response to having detected the electronic input/request at 810, the instrumentation module 150 identifies a portion of the source code that is to be tagged. In one approach, the instrumentation module 150 tracks HMI inputs upon detecting the request to identify a subsequent selection identifying the code segment that is to be tagged. Alternatively, the request itself indicates the code segment, and, thus, the instrumentation module 150 parses the request in order to identify the code segment. In either case, the code segment is identified as a high-value code segment that is to be tagged through generation and identification of the request.

At 830, the instrumentation module 150 tags the identified code segment with an instrumentation identifier. In one embodiment, the instrumentation module 150 tags the identified code segment by including a comment within the source code that indicates the identified code segment is to be instrumented. The comment may also include characteristics relating to the code segment and how the code segment is to be instrumented. That is, the comment can specify that the instrumentation is to provide program control flow protections, data type checks, etc. while also indicating the identified segment is to be automatically instrumented. Moreover, it should be appreciated that the format of the comment generally includes one or more particular sequences of characters that are encoded to convey the noted information and to provide for easily identifying the tag when subsequently instrumenting the source code.

At 840, the instrumentation module 150 instruments the tagged function. As previously discussed in detail, the instrumentation module 150 can identify and automatically instrument code segments. Accordingly, at 840, the instrumentation module 150, in one embodiment, follows a similar approach as discussed in relation to method 700. However, in the instant case, the code segment/function is already identified according to the tag, and thus the instrumentation module 150 need not separately analyze the source code to independently identify the function. Moreover, the instrumentation module 150, in one embodiment, otherwise instruments the function as discussed along with block 730 in response to the tag included with the identified code segment.

Additionally, it should be appreciated that the control flow system 100 from FIG. 1 can be configured in various arrangements with separate integrated circuits and/or chips. In such embodiments, the analysis module 130 from FIG. 1 is embodied as a separate integrated circuit. Additionally, the graph module 140 is embodied on an individual integrated circuit. Moreover, the instrumentation module 150 is embodied on a separate integrated circuit. The circuits are connected via connection paths to provide for communicating signals between the separate circuits. Of course, while separate integrated circuits are discussed, in various embodiments, the circuits may be integrated into a common integrated circuit board. Additionally, the integrated circuits may be combined into fewer integrated circuits or divided into more integrated circuits. In another embodiment, the modules 130, 140, and 150 may be combined into a separate application-specific integrated circuit. In further embodiments, portions of the functionality associated with the modules 130, 140, and 150 may be embodied as firmware executable by a processor and stored in a non-transitory memory. In still further embodiments, the modules 130, 140, and 150 are integrated as hardware components of the processor 110.

In another embodiment, the described methods and/or their equivalents may be implemented with computer-executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The control flow system 100 can include one or more processors 110. In one or more arrangements, the processor(s) 110 can be a main processor of the control flow system 100. For instance, the processor(s) 110 can be an electronic control unit (ECU). The control flow system 100 can include one or more data stores for storing one or more types of data. The data stores can include volatile and/or non-volatile memory. Examples of suitable data stores include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, distributed memories, cloud-based memories, other storage medium that are suitable for storing the disclosed data, or any combination thereof. The data stores can be a component of the processor(s) 110, or the data store can be operatively connected to the processor(s) 110 for use thereby. The term "operatively connected," as used throughout this description, can include direct or indirect connections, including connections without direct physical contact.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term, and that may be used for various implementations. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A control flow system for improving the functioning of a program, comprising:
   one or more processors;
   a memory communicably coupled to the one or more processors and storing:
   an analysis module including instructions that when executed by the one or more processors cause the one or more processors to, in response to detecting a code segment being added to source code of the program, identify control flow characteristics of the source code including the code segment; and
   a graph module including instructions that when executed by the one or more processors cause the one or more processors to dynamically update a control flow graph of the source code in real-time according to the control flow characteristics and responsive to the code segment being added to the source code, wherein the control flow graph represents execution paths through the program that are comprised of nodes representing blocks of the source code and directed edges between the nodes representing transitions between the blocks,
   wherein the graph module includes instructions to dynamically update the control flow graph including instructions to add the control flow characteristics corresponding to the code segment to the control flow graph by performing one or more of: adding one or more new nodes, adding one or more new edges, modifying one or more existing nodes, and modifying one or more existing edges of the control flow graph,
   wherein the graph module further includes instructions to provide the control flow graph to improve functioning of the program by facilitating adjustments in the source code.

2. The control flow system of claim 1, wherein the analysis module includes instructions to identify the control flow characteristics including instructions to analyze the source code using a depth-first search to traverse statements within the source code and identify at least function calls, function return addresses, function arguments, function return values, and relationships between the statements as the control flow characteristics, and wherein the control flow graph represents procedural control flow transfers of the program.

3. The control flow system of claim 1, wherein the graph module includes instructions to provide the control flow graph including instructions to generate a visual representation of the control flow graph and dynamically displaying the visual representation within an integrated development environment (IDE) as the code segment is generated to provide a real-time representation of the program through the control flow graph.

4. The control flow system of claim 1, wherein the graph module includes instructions to provide the control flow graph including instructions to provide the control flow graph in real-time as the source code is developed to improve program functionality by ensuring the program avoids performance bottlenecks and security vulnerabilities,
   wherein the analysis module includes instructions to detect the code segment includes monitoring an electronic input stream to an integrated development environment (IDE) within a computing device for statements that comprise the code segment, and wherein the code segment forms a portion of the source code.

5. The control flow system of claim 1, wherein the analysis module includes instructions to identify the control flow characteristics of the source code including instructions to determine which statements of the source code include vulnerabilities by comparing the control flow characteristics with a graph policy that defines conditions indicative of security vulnerabilities and performance bottlenecks,
   wherein the graph policy specifies conditions in the program associated with data flow, data argument, data exposure, and program flow that correlate with the vulnerabilities, and
   wherein the graph module includes instructions to update the control flow graph including instructions to tag the statements that include the vulnerabilities to facilitate mitigation of the vulnerabilities.

6. The control flow system of claim 1, further comprising:
   an instrumentation module including instructions that when executed by the one or more processors cause the one or more processors to, responsive to a request to instrument the program, integrate instrumentation within the source code according to the control flow graph to enforce runtime checks within the program that improve security of the program by ensuring execution of the program follows the control flow graph.

7. The control flow system of claim 6, wherein the instrumentation module includes instructions to integrate instrumentation within the source code including instructions to i) identify segments of the source code that are to be instrumented according to correlations between the control flow graph and the source code and ii) automatically add the instrumentation according to the identified segments by modifying templates of defined instrumentation according to the source code, and
   wherein the request is an electronic request generated via an integrated development environment (IDE) and initiated in parallel with a request to a request to compile the program.

8. The control flow system of claim 6, wherein the instrumentation module includes instructions to, in response to detecting an electronic input identifying a function within the source code, tag the function with an instrumentation identifier that specifies the function is to be instrumented automatically.

9. A non-transitory computer-readable medium storing instructions for improving the functioning of a program and that when executed by one or more processors cause the one or more processors to:
   in response to detecting a code segment being added to source code of the program, identify control flow characteristics of the source code including the code segment;
   dynamically update a control flow graph of the source code in real-time according to the control flow characteristics and responsive to the code segment being added to the source code, wherein the control flow graph represents execution paths through the program that are comprised of nodes representing blocks of the source code and directed edges between the nodes representing transitions between the blocks, and wherein the instructions to dynamically update the control flow graph include instructions to add the control flow characteristics corresponding to the code segment to the control flow graph by performing one or more of: adding one or more new nodes, adding one or more new edges, modifying existing nodes, and modifying one or more existing edges of the control flow graph; and provide the control flow graph to improve functioning of the program by facilitating adjustments in the source code.

10. The non-transitory computer-readable medium of claim 9, wherein the instructions to identify the control flow characteristics include instructions to analyze the source code using a depth-first search to traverse statements within the source code and identify at least function calls, function return addresses, function arguments, function return values, and relationships between the statements as the control flow characteristics, and wherein the control flow graph represents procedural control flow transfers of the program.

11. The non-transitory computer-readable medium of claim 9, wherein the instructions to provide the control flow graph include instructions to generate a visual representation of the control flow graph and dynamically display the visual representation within an integrated development environment (IDE) as the code segment is generated to provide a real-time representation of the program through the control flow graph, and wherein the instructions to update the control flow graph including instructions to add the control flow characteristics corresponding to the code segment to the control flow graph while modifying existing nodes and edges of the control flow graph to accommodate the code segment.

12. The non-transitory computer-readable medium of claim 9, wherein the instructions further include instructions to, responsive to a request to instrument the program, integrate instrumentation within the source code according to the control flow graph to enforce runtime checks within the program that improve security of the program by ensuring execution of the program follows the control flow graph.

13. A method of improving the functioning of a program, comprising:

in response to detecting a code segment being added to source code of the program, identifying control flow characteristics of the source code including the code segment;

dynamically updating a control flow graph of the source code in real-time according to the control flow characteristics and responsive to the code segment being added to the source code, wherein the control flow graph represents execution paths through the program that are comprised of nodes representing blocks of the source code and directed edges between the nodes representing transitions between the blocks, wherein dynamically updating the control flow graph includes adding the control flow characteristics corresponding to the code segment to the control flow graph by performing one or more of: adding one or more new nodes, adding one or more new edges, modifying one or more existing nodes, and modifying one or more existing edges of the control flow graph; and providing the control flow graph to improve functioning of the program by facilitating adjustments in the source code.

14. The method of claim 13, wherein identifying the control flow characteristics includes analyzing the source code using a depth-first search to traverse statements within the source code and identify at least function calls, function return addresses, function arguments, function return values, and relationships between the statements as the control flow characteristics, and wherein the control flow graph represents procedural control flow transfers of the program.

15. The method of claim 13, wherein providing the control flow graph includes generating a visual representation of the control flow graph and dynamically displaying the visual representation within an integrated development environment (IDE) as the code segment is generated to provide a real-time representation of the program through the control flow graph.

16. The method of claim 13, wherein providing the control flow graph includes providing the control flow graph in real-time as the source code is developed to improve program functionality by ensuring the program avoids performance bottlenecks and security vulnerabilities, wherein detecting the code segment includes monitoring an electronic input stream to an integrated development environment (IDE) within a computing device for statements that comprise the code segment, and wherein the code segment forms a portion of the source code.

17. The method of claim 13, wherein identifying the control flow characteristics of the source code includes determining which statements of the source code include vulnerabilities by comparing the control flow characteristics with a graph policy that defines conditions indicative of security vulnerabilities and performance bottlenecks, wherein the graph policy specifies conditions in the program associated with data flow, data argument, data exposure, and program flow that correlate with the vulnerabilities, and wherein updating the control flow graph includes tagging the statements that include the vulnerabilities to facilitate mitigation of the vulnerabilities.

18. The method of claim 13, further comprising:

responsive to a request to instrument the program, integrating instrumentation within the source code according to the control flow graph to enforce runtime checks within the program that improve security of the program by ensuring execution of the program follows the control flow graph.

19. The method of claim 18, wherein integrating instrumentation within the source code includes i) identifying segments of the source code that are to be instrumented according to correlations between the control flow graph and the source code and ii) automatically adding the instrumentation according to the identified segments by modifying templates of defined instrumentation according to the source code, and wherein the request is an electronic request generated via an integrated development environment (IDE) and initiated in real-time in response to detecting the code segment.

20. The method of claim 18, further comprising:

in response to detecting an electronic input identifying a function within the source code, tagging the function with an instrumentation identifier that specifies the function is to be instrumented automatically, wherein the instrumentation identifier indicates the function is of a high value for including the instrumentation.

* * * * *